United States Patent
Boudreau et al.

(10) Patent No.: US 10,749,580 B2
(45) Date of Patent: Aug. 18, 2020

(54) VIRTUALIZED MASSIVE MIMO IN MULTI-OPERATOR WIRELESS NETWORKS

(71) Applicant: Telefonaktiebolaget LM Ericsson (publ), Stockholm (SE)

(72) Inventors: Gary David Boudreau, Kanata (CA); Ben Liang, Whitby (CA); Seyed Hossein Seyedmehdi, Kanata (CA); Mohammadmoein Soltanizadeh, Kerman (IR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 15/851,318

(22) Filed: Dec. 21, 2017

(65) Prior Publication Data
US 2018/0331731 A1 Nov. 15, 2018

Related U.S. Application Data

(60) Provisional application No. 62/505,170, filed on May 12, 2017.

(51) Int. Cl.
*H04B 7/0452* (2017.01)
*H04B 7/0456* (2017.01)
(Continued)

(52) U.S. Cl.
CPC ......... *H04B 7/0452* (2013.01); *H04B 7/0456* (2013.01); *H04B 7/0626* (2013.01); *H04B 17/104* (2015.01)

(58) Field of Classification Search
CPC .. H04B 7/0456; H04B 7/0617; H04B 7/0452; H04B 7/0632; H04B 7/0413; H04B 17/104; H04B 17/24
(Continued)

(56) References Cited

U.S. PATENT DOCUMENTS

2014/0219267 A1* 8/2014 Eyuboglu ........... H04W 56/001
                                                                370/350
2017/0019297 A1* 1/2017 Rakib ................. H04B 7/0613
(Continued)

FOREIGN PATENT DOCUMENTS

EP        2854301 A1    4/2015

OTHER PUBLICATIONS

Al-Naffouri, T.Y., et al., "On the distribution of indefinite quadratic forms in Gaussian random variables," Proceedings of the IEEE International Symposium on Information Theory (ISIT), Seoul, Republic of Korea, Jul. 2009, pp. 1744-1748.
(Continued)

*Primary Examiner* — David C Payne
*Assistant Examiner* — Sarah Hassan
(74) *Attorney, Agent, or Firm* — Withrow & Terranova, PLLC

(57) ABSTRACT

A method and device for adjusting a channel precoding matrix for one or more users operating in a virtualized Massive Multi-Input Multi-Output (M-MIMO) wireless network managed by a neutral host. Each of the users receive wireless services from one or more service providers (SP). For each service provider, a set of N antennas are selected from all available antennas managed by the neutral host. Channel information for each user of each service provider is obtained. A precoding matrix from each SP is defined according to each SP channel and state information. If all channel state information (CSI) parameters are known, and if the CSI parameters are all known, a final precoding matrix based on the known CSI is derived, whereas if only a subset of CSI parameters are known, a final precoding matrix based on the known subset CSI parameters is derived.

10 Claims, 12 Drawing Sheets

(51) Int. Cl.
*H04B 7/06* (2006.01)
*H04B 17/10* (2015.01)

(58) Field of Classification Search
USPC .......................................... 370/329; 382/167
See application file for complete search history.

(56) References Cited

U.S. PATENT DOCUMENTS

2017/0033899 A1\* 2/2017 Rakib ................... H04L 5/0007
2017/0064675 A1\* 3/2017 Kim .................... H04W 72/042

OTHER PUBLICATIONS

Banchs, A., et al., "Providing throughput and fairness guarantees in virtualized WLANs through control theory," Mobile Networks and Application, vol. 17, No. 4, Springer Science+Business Media, LLC, Jun. 3, 2012, 12 pages.

Bhanage, G., et al., "SplitAP: leveraging wireless network virtualization for flexible sharing of WLANs," 2010 IEEE Global Telecommunications Conference (GLOBECOM 2010), Dec. 6-10, 2010, Miami, Florida, USA, 6 pages.

Goldsmith, A., "Wireless Communications," Cambridge University Press, 2005, 571 pages.

Jumba, V., et al., "Resource Provisioning in Wireless Virtualized Networks via Massive-MIMO," IEEE Wireless Communications Letters, vol. 4, No. 3, Jun. 2015, 5 pages.

Jumba, V., et al., "Energy-Efficient Robust Resource Provisioning in Virtualized Wireless Networks," 2015 IEEE International Conference on Ubiquitous Wireless Broadband (ICUWB), Oct. 4-7, 2015, Montreal, QC, Canada, 5 pages.

Parsaeefard, S., et al., "Joint Resource Provisioning and Admission Control in Wireless Virtualized Networks," 2015 IEEE Wireless Communications and Networking Conference (WCNC):—Track 3: Mobile and Wireless Networks, Mar. 9-12, 2015, New Orleans, Louisiana, USA, pp. 2020-2025.

Soltanizadeh, M., "Power Minimization in Wireless Network Virtualization with Massive MIMO," Master's Thesis, University of Toronto, 2017, 77 pages.

Wang, X., et al., "Wireless network virtualization," Journal of Communications, vol. 8, No. 5, May 2013, pp. 337-344.

Yang, M., et al., "Karnaugh-map like online embedding algorithm of wireless virtualization," 2012 15th International Symposium on Wireless Personal Multimedia Communications (WPMC), Sep. 24-27, 2012, Taipei, Taiwan, pp. 594-598.

Yun, D., et al., "Virtual Network Embedding in Wireless Multihop Networks," Proceedings of the 6th International Conference on Future Internet Technologies, Jun. 13-15, 2011, Seoul, Republic of Korea, 4 pages.

Zaki, Y., et al., "LTE Wireless Virtualization and Spectrum Management," 2010 Third Joint IFIP Wireless and Mobile Networking Conference (WMNC), Oct. 13-15, 2010, Budapest, Hungary, 7 pages.

Zaki, Y., et al., "LTE mobile network virtualization," Mobile Networks and Applications, vol. 16, No. 4, Springer Science+Business Media, LLC, Jun. 10, 2011, pp. 424-432.

Zhou, Y, et al., "Game theory based bandwidth allocation scheme for network virtualization," 2010 IEEE Global Telecommunications Conference (GLOBECOM 2010), Dec. 6-10, 2010, Miami, Florida, USA, 5 pages.

Zhu, K., et al., "Virtualization of 5G cellular networks as a hierarchical combinatorial auction," IEEE Transactions on Mobile Computing, vol. 15, No. 10, Oct. 2016, 16 pages.

International Search Report and Written Opinion for International Patent Application No. PCT/IB2018/051291, dated May 16, 2018, 14 pages.

\* cited by examiner

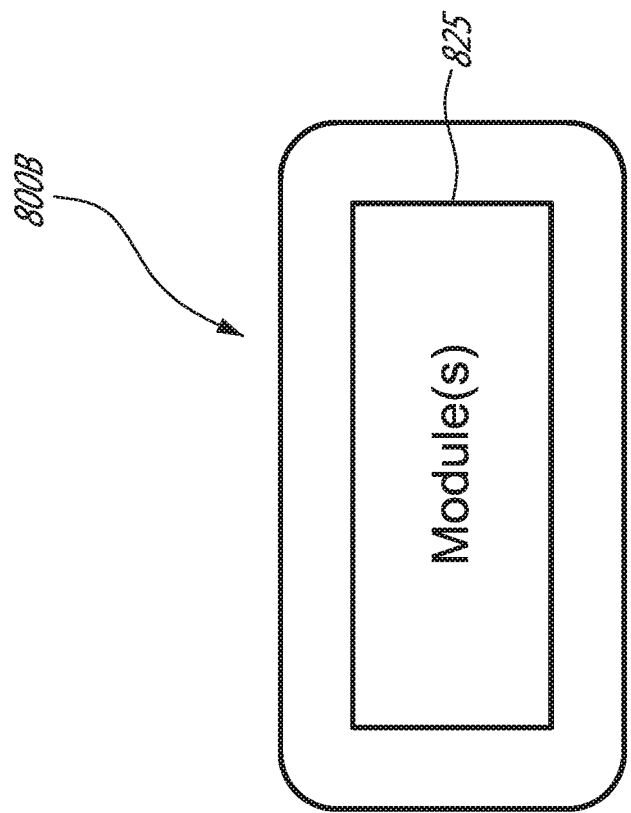
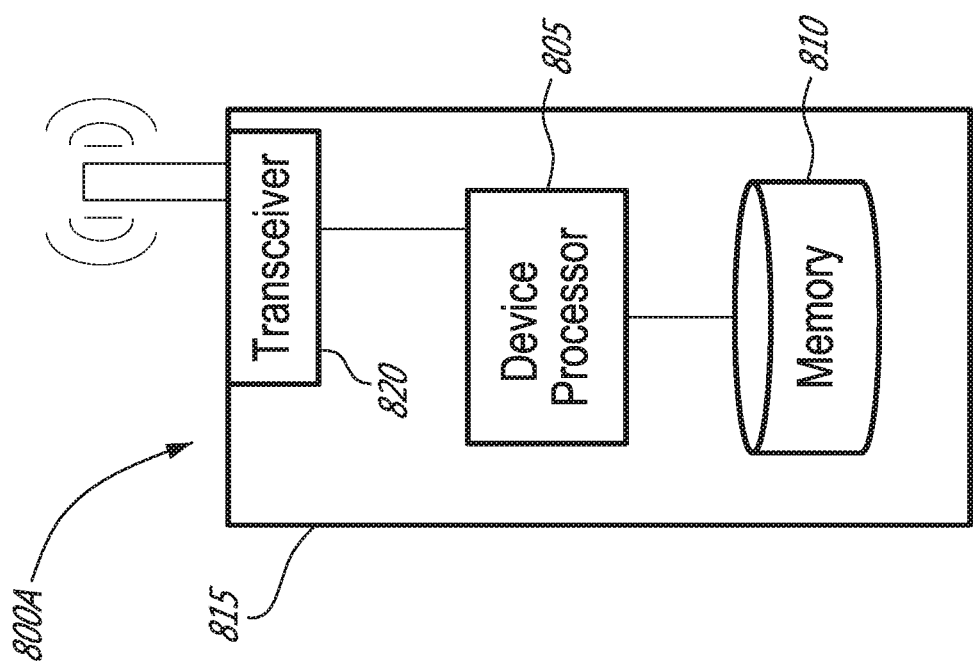

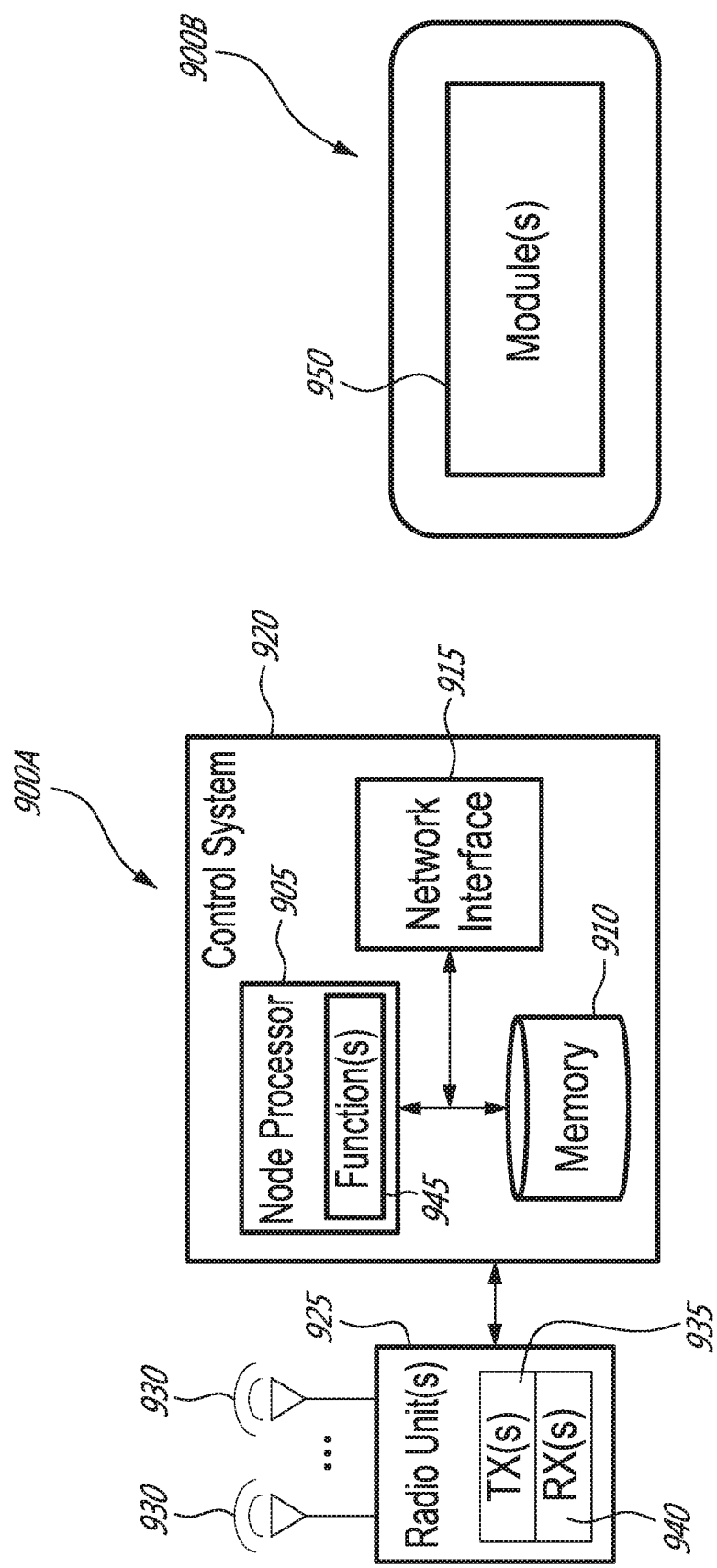

VIRTUALIZED MASSIVE MIMO IN MULTI-OPERATOR WIRELESS NETWORKS

TECHNICAL FIELD

Embodiments of the invention relate to the field of wireless communication, and more specifically, to massive Multi-Input, Multi-Output operation in a virtualized multi-operator wireless network.

BACKGROUND

Network Virtualization

The demand for higher data rate and the emergence of new technologies is increasing the capital expenses (CapEx) and operational expenses (OpEx) of service providers. This growth in expenses and the need for investment has not only demotivated the service providers to deploy modern technologies but also hindered new companies to enter the wireless industry. The concept of virtualization has been proposed to reduce these expenses of network deployment and operation by abstracting and sharing physical resources, and to ease migration to newer products and technologies by decoupling distinct parts of the network.

When virtualization is employed in wireless networks, due to the intrinsic properties of the wireless environment, new challenges arise and significant differences from a wired network occur. There are many topologies (single hop, multi-hop, ad hoc), different spectrum bands (licensed and unlicensed), different access technologies, e.g. 3G, 4G and WiMax, with distinctive characteristics and properties in wireless networks. These properties make virtualization, and specifically offering a universal virtualized framework, difficult in wireless networks.

Generally, as shown in FIG. 1, a virtualized network is composed of Infrastructure providers (or InPs) 100 that create and manage the infrastructure or physical wireless network 101 (e.g. base station, Mobility Management Entities (MMEs), S-Gateways, Access Points (APs), Spectrum, etc.) and Service Providers (or SPs) 102 such as SP 10a, 102b and 102c. As used herein, SP 102 refers to one or more of SPs 102a-c. SPs 102 utilize the virtual resources 103, such as 103a for voice, 103b for gaming and 103c for video and provide services to subscribers. As used herein, virtual resources 103 refers to one or more of virtual resources 103a-c.

The InP 100 virtualizes the resources that are owned by itself (or possibly other InPs) and splits them into slices. These slices consist of (virtualized) core networks and (virtualized) access networks corresponding to wired slice and the wireless slice, respectively. In FIG. 1, some of these resources also consist of radio spectrum 104.

After creating the slices, i.e. executing the virtualization of physical resources, the SPs lease these virtual resources, and operate and program them to provide end-to-end services to end users 105, without knowing the underlying physical architecture of the InP's. After creating the slices, i.e. executing the virtualization of physical resources, the SPs lease these virtual resources, and operate and program them to provide end-to-end services to end-users, without knowing the underlying physical architecture of the InP's. Virtualization by the InP makes physical resources behind the slices hidden to the SPs and creates a logical representation of the entire system.

When used by multiple operators, wireless network virtualization makes use of a Neutral Host (NH). Neutral host providers are entities that plan, install and run the radio access network but do not have their own subscribers and (usually) do not own their own radio spectrum licenses, instead they lease their network capabilities to other wireless service providers. E.g. a sports stadium neutral host provider that leases the network to 1 or more wireless service providers.

Wireless network virtualization necessitates the implementation of the following basic requirements:

1. Coexistence: Wireless network virtualization should provide the creation of several virtual resources to coexist on a common physical infrastructure. As such, it is the purpose of virtualization to allow multiple systems to run on the same physical resources.
2. Flexibility, manageability and programmability: wireless network virtualization should provide different services with independent networking through decoupling the components of the network. Virtualization will also allow SPs to customize their services and provide an opportunity to use new products in the network.
3. Isolation: Isolation ensures that any changes in other's slices, system configuration or network topology do not impact the slice or the service offered to a given SP. Isolation is the primary requirement that enables the perception that a slice is the entire network.
4. Efficiency: Wireless network virtualization enables a network to be utilized better in terms of physical resources and spectrum.

Problems with Existing Solutions

Certain embodiments are presented in recognition of shortcomings associated with conventional techniques and technologies, such as the following examples. There are a few studies of virtualization of Massive Multiple-Input Multiple-Output (M-MIMO) or resource provisioning in wireless networks via M-MIMO, however, they failed to fully explain how to ensure the requirements of virtualization. For instance, it is unspecified how the SPs can program their services, e.g. design precoding matrices or perform scheduling. The other weakness is with some of the assumptions made in these studies. It has been assumed that different SPs use a disjoint set of antennas without fully explaining the reason. It has also been assumed the resource blocks are orthogonal. These weaknesses are addressed in the present disclosure by proposing a framework for the network and introducing a novel precoding algorithm.

Although the precoding problem has been well studied in wireless communication, and different schemes of precoding have been proposed, new challenges arise when it comes to wireless network virtualization. Since the SPs cannot have access to the channel information of the users of other SPs, handling the interference can potentially be challenging. For instance, if the SPs use typical schemes of precoding and have the InP send their precoding matrices without considering the other SPs, the system will likely incur a large amount of interference.

SUMMARY

It is proposed in certain embodiments of the disclosed subject matter that the InP should manage the interference between SP's, and it should be in a way that the users of the SP receive nearly the identical transmission and signal quality that the SPs have designed for them.

In certain embodiments of the disclosed subject matter, a Massive Multi-Input Multi-Output (M-MIMO) wireless network is virtualized. M-MIMO wireless communications refers to equipping cellular base stations (BSs) with a large number of antennas, typically on the order of 100 or more. The number of degrees of freedom that this provides allows effective concentration of power as well as interference suppression over multiple mobile devices. Certain embodiments of the disclosed subject matter relates to Virtualization of M-MIMO to transparently support the simultaneous provisioning of multiple operators on a single network infrastructure.

According to one aspect of the disclosure, in some embodiments, a method is provided for adjusting a channel precoding matrix for one or more users operating in a virtualized Massive Multi-Input Multi-Output (M-MIMO) wireless network managed by a neutral host, each of said users receiving wireless services from one or more service providers (SP). The method includes selecting for each service provider, N antennas from all available antennas managed by said neutral host, obtaining corresponding channel information for each user of each service provider, receiving from each SP a precoding matrix defined according to each SP channel and state information, determining if all channel state information (CSI) parameters are known, and if the CSI parameters are all known, a final precoding matrix based on the known CSI is derived, whereas if only a subset of CSI parameters are known, a final precoding matrix based on the known subset CSI parameters is derived.

According to another aspect of the disclosure, in some embodiments, a method is provided for adjusting a channel precoding matrix for one or more users operating in a virtualized Massive Multi-Input Multi-Output (M-MIMO) wireless network managed by a neutral host, each of said users receiving wireless services from one or more service providers (SP). The method includes receiving from each SP, channel information for each of its users, select a set of antennas for a predetermined transmission period, determining if the received user channel information deviates from the channel information the SP expects the user to receive, adjusting weights of a precoding matrix such that the received signal is less than a predetermined threshold if the received user channel information deviates from the channel information the SP expects the user to receive, and maintaining current weights of a precoding matrix if the received user channel information does not deviate from the channel information the SP expects the user to receive.

According to another aspect of the disclosure, in some embodiments, a network device is provided for adjusting a channel precoding matrix for one or more users operating in a virtualized Massive Multi-Input Multi-Output (M-MIMO) wireless network managed by a neutral host, each of said users receiving wireless services from one or more service providers (SP). The network device includes N antennas, one or more of the N antennas being selected for each service provider and processing circuitry including a memory and a processor, the memory in communication with the processor. The memory has instructions that, when executed by the processor, configure the processor to obtain channel information for each user of each service provider, receive from each SP a precoding matrix defined according to each SP channel and state information, determine if all channel state information (CSI) parameters are known and if the CSI parameters are all known, a final precoding matrix based on the known CSI is derived, whereas if only a subset of CSI parameters are known, a final precoding matrix based on the known subset CSI parameters is derived.

According to another aspect of the disclosure, in some embodiments, a network device is provided for adjusting a channel precoding matrix for one or more users operating in a virtualized Massive Multi-Input Multi-Output (M-MIMO) wireless network managed by a neutral host, each of the users receiving wireless services from one or more service providers (SP). The network device includes a receiver configured to receive from each SP, channel information for each of its users and select a set of antennas for a predetermined transmission period and processing circuitry. The processing circuitry including a memory and a processor, the memory is in communication with the processor. The memory has instructions that, when executed by the processor, configure the processor to determine if the received user channel information deviates from the channel information the SP expects the user to receive, adjust weights of a precoding matrix such that the received signal is less than a predetermined threshold if the received user channel information deviates from the channel information the SP expects the user to receive and maintain the current weights of a precoding matrix if the received user channel information does not deviate from the channel information the SP expects the user to receive.

In a first option, a method is described of selecting a precoding matrix to minimize the transmission power in a virtualized M-MIMO network subject to constraints on inter-Service Provider (SP) interference under perfect Channel State Information (CSI).

In a second option, a method is described of selecting a precoding matrix to minimize the transmission power subject to constraints on inter-SP interference under non-perfect CSI.

In a third option, a method is described of providing a lower limit for transmission power in a virtualized M-MIMO network.

In a fourth option, a method is described to select transmission antennas under perfect or non-perfect CSI in a virtualized M-MIMO network.

Advantages of the Proposed Solution

Certain embodiments may provide potential benefits compared to conventional techniques and technologies, such as the following examples.

The proposed virtualized M-MIMO precoding and antenna deployment methods minimize the transmit power of an InP to service multiple SP in a neutral host type deployment.

The proposed virtualized M-MIMO precoding and antenna deployment methods achieve close to optimal throughput for both aggregate cellular users and cell edge users of multiple service providers in a neutral host scenario.

The proposed virtualized M-MIMO precoding and antenna deployment methods have low complexity and can be implemented within the DSP processing capabilities of existing wireless base station implementations.

The proposed virtualized M-MIMO precoding and antenna deployment methods can be implemented practically using existing channel feedback signaling in the LTE network and are not limited by pilot pollution problems or also known as antenna reference symbols.

The proposed virtualized M-MIMO deployments can be adapted to varying SINR, QoS, and the number of deployed antennas.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8A illustrates a wireless communication device according to an embodiment of the disclosed subject matter.

FIG. 8B illustrates a wireless communication device according to another embodiment of the disclosed subject matter.

FIG. 9A illustrates a radio access node according to an embodiment of the disclosed subject matter.

FIG. 9B illustrates a radio access node according to another embodiment of the disclosed subject matter.

DETAILED DESCRIPTION

Figure 1:
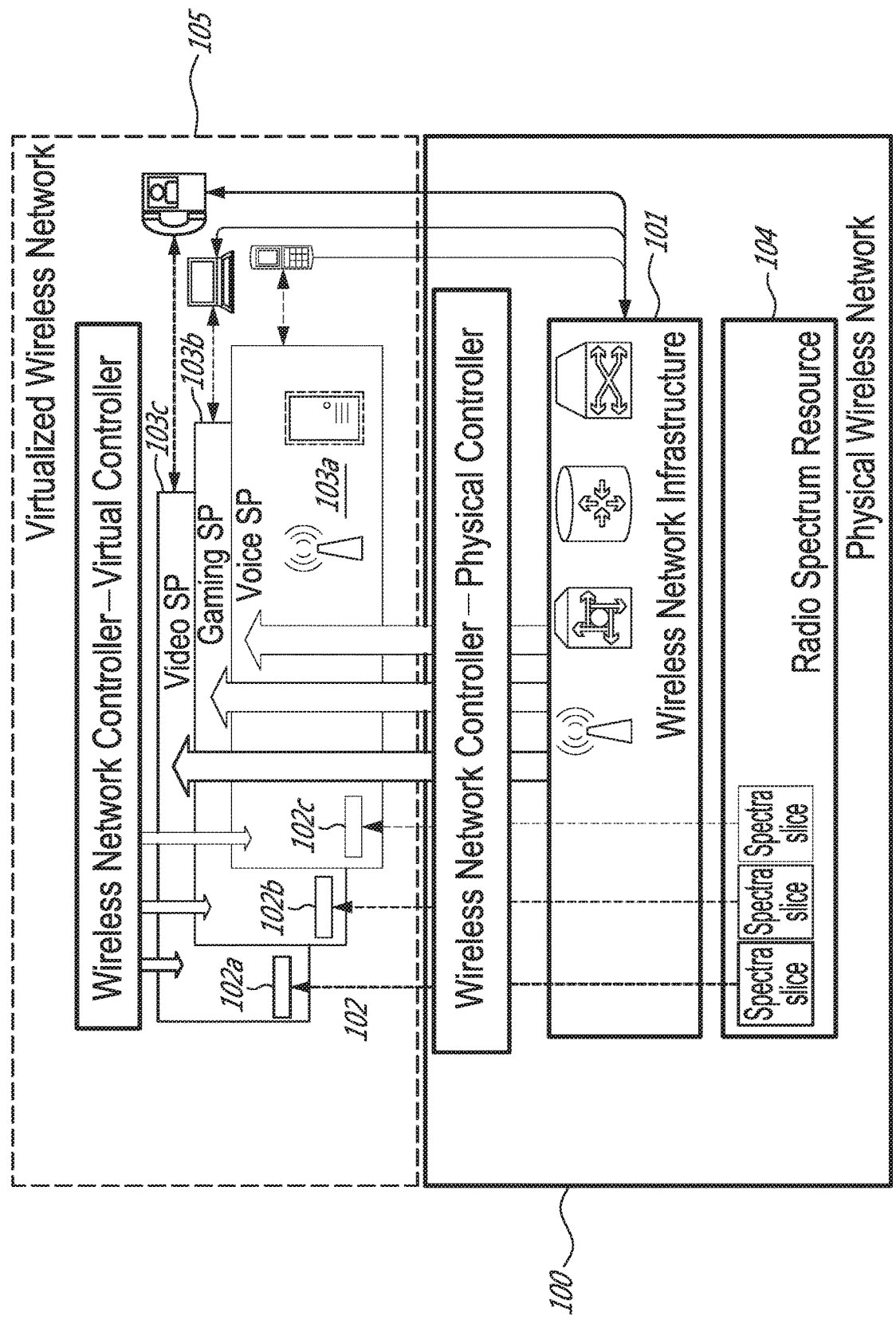
FIG. 1 illustrates a typical virtualized network architecture.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The invention comprises embodiments, which can be implemented in a network node and a M-MIMO capable UE. The network node herein can be the serving network node of the M-MIMO UE or any network node with which the M-MIMO UE can establish or maintain a communication link and/or receive information (e.g. via broadcast channel).

The embodiments use a generic term 'network node' that may be any kind of network node. Examples are eNodeB, Node B, Base Station, wireless access point (AP), base station controller, radio network controller, relay, donor node controlling relay, base transceiver station (BTS), transmission points, transmission nodes, Remote Radio Unit (RRU), Remote Radio Head (RRH), nodes in distributed antenna system (DAS), core network node, Mobility Management Entity (MME), etc.

The embodiments also use a generic term 'M-MIMO UE' or simply 'UE'. However, a M-MIMO UE can be any type of wireless device, which is capable of at least M-MIMO communication through wireless communication. Examples of such M-MIMO UEs are a sensor, modem, smart phone, machine type (MTC) device aka machine to machine (M2M) device, PDA, iPad, Tablet, smart phone, laptop embedded equipped (LEE), laptop mounted equipment (LME), USB dongles etc.

Although terminology from 3GPP LTE (or E-UTRAN) has been used in this disclosure to exemplify the invention and describe both the serving and target network nodes, this should not be seen as limiting the scope of the invention to only the aforementioned system. Other wireless systems, including WCDMA, UTRA FDD, UTRA TDD, and GSM/GERAN/EDGE, may also benefit from exploiting the ideas covered within this disclosure. Furthermore, this invention can apply to scenarios in which the serving and target nodes employ differing radio access technologies (RATs).

The embodiments are described when the M-MIMO UE is configured to be served by or operate with single carrier (aka single carrier operation of the UE) for M-MIMO communication or configured to use or operate single carrier in a network node. However, the embodiments are also applicable for multi-carrier or carrier aggregation based M-MIMO communication.

For convenience and without loss of generality we assume that all the components in a virtualized wireless network are encompassed into two entities, namely; a Service Provider and an Infrastructure Provider. The SPs are responsible for serving the subscribers and programming their services, and the InPs own the infrastructure, execute virtualization and manage the services. We also assume that the other parts of the network including the core network and computational resources are already virtualized and can be utilized by the SPs and the InPs. It should be noted that in some embodiments, the InP may have a set of users that are to be served by the InP and thus, the InP can in certain circumstances also be an SP.

Note that, in the description herein, reference may be made to the term "cell"; however, particularly with respect to 5G NR concepts, beams may be used instead of cells and, as such, it is important to note that the concepts described herein are equally applicable to both cells and beams.

Wireless network virtualization has been studied under two categories in the literature. The first category focuses on resource allocation and spectrum partitioning and enforcing fairness among users, while the second category studies how virtualization can be applied to the technologies in wireless networks. Certain embodiments described herein belongs to the second category and the virtualization of M-MIMO technology.

Figure 2:
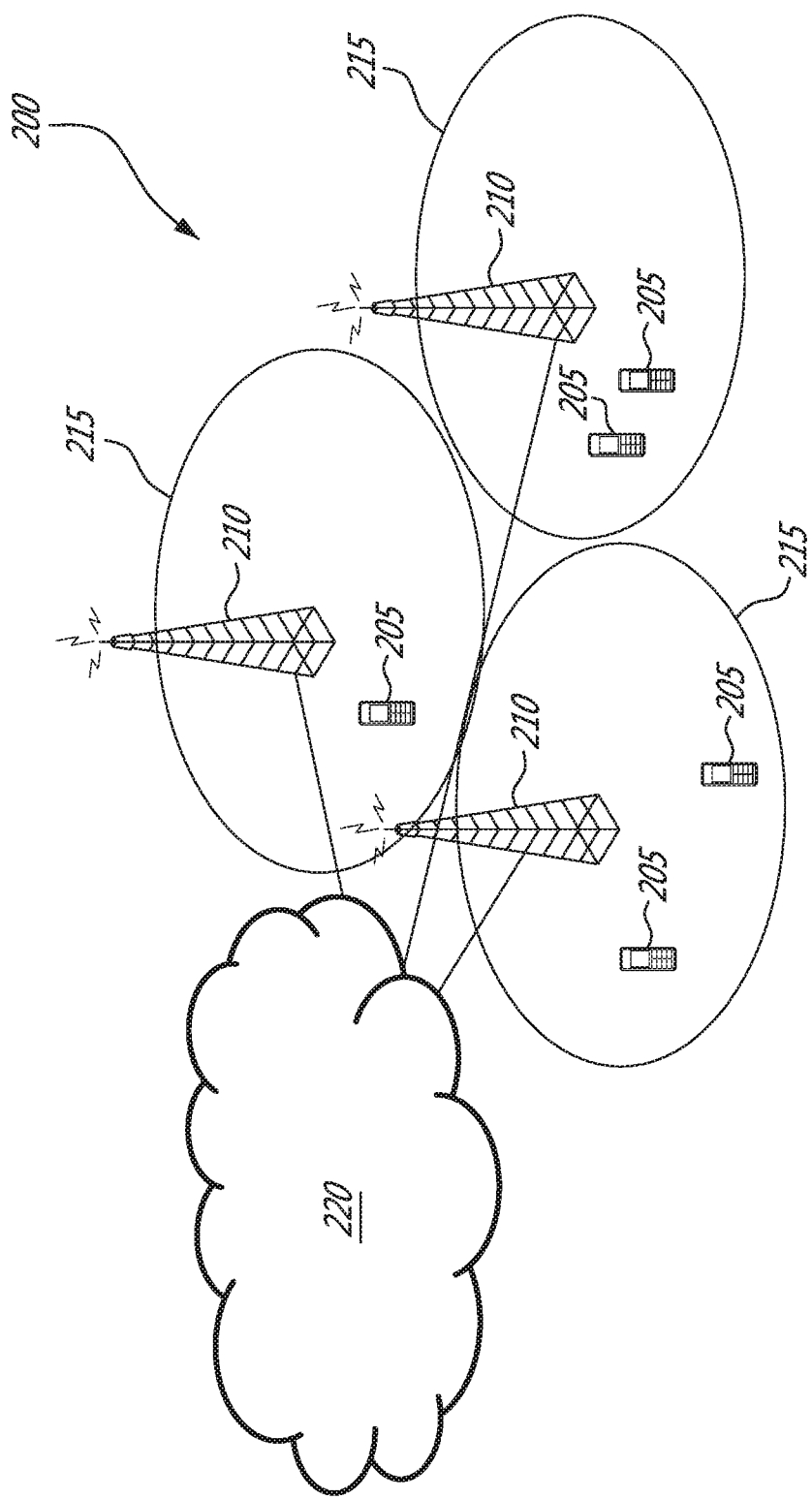
FIG. 2 illustrates a communication system according to an embodiment of the disclosed subject matter

Referring now to FIG. 2, a communication system 200 comprises a plurality of wireless communication devices 205 (e.g., UEs, machine type communication [MTC]/machine-to-machine [M2M] UEs) and a plurality of radio access nodes 210 (e.g., eNodeBs or other base stations). Communication system 200 is organized into cells 215, which are connected to a core network 220 via corresponding radio access nodes 210. Radio access nodes 210 are capable of communicating with wireless communication devices 205 along with any additional elements suitable to support communication between wireless communication devices or between a wireless communication device and another communication device (such as a landline telephone).

Although wireless communication devices 205 may represent communication devices that include any suitable combination of hardware and/or software, these wireless communication devices may, in certain embodiments, represent devices such as those illustrated in greater detail by FIGS. 8A and 8B. Similarly, although the illustrated radio access node may represent network nodes that include any suitable combination of hardware and/or software, these nodes may, in particular embodiments, represent devices such those illustrated in greater detail by FIGS. 8A, 8B and 9A and 9B.

Communication system 200 for the purpose of this disclosure represents a Massive Multi-Input Multi-Output (M-MIMO) wireless network which is virtualized. The radio access nodes 210 are equipped with a large number of antennas, typically on the order of 100 or more to form a M-MIMO wireless communication system. The number of degrees of freedom that this provides allows effective concentration of power as well as interference suppression over multiple mobile devices. The virtualization of this M-MIMO wireless communication system 200 can transparently support the simultaneous provisioning of multiple operators on a single network infrastructure. In a virtualization communication system such as system 200, one cell or more cells could be owned by a InP and each cell or multiple cells can be sliced to create virtualized network for multiple operators.

Figure 3:
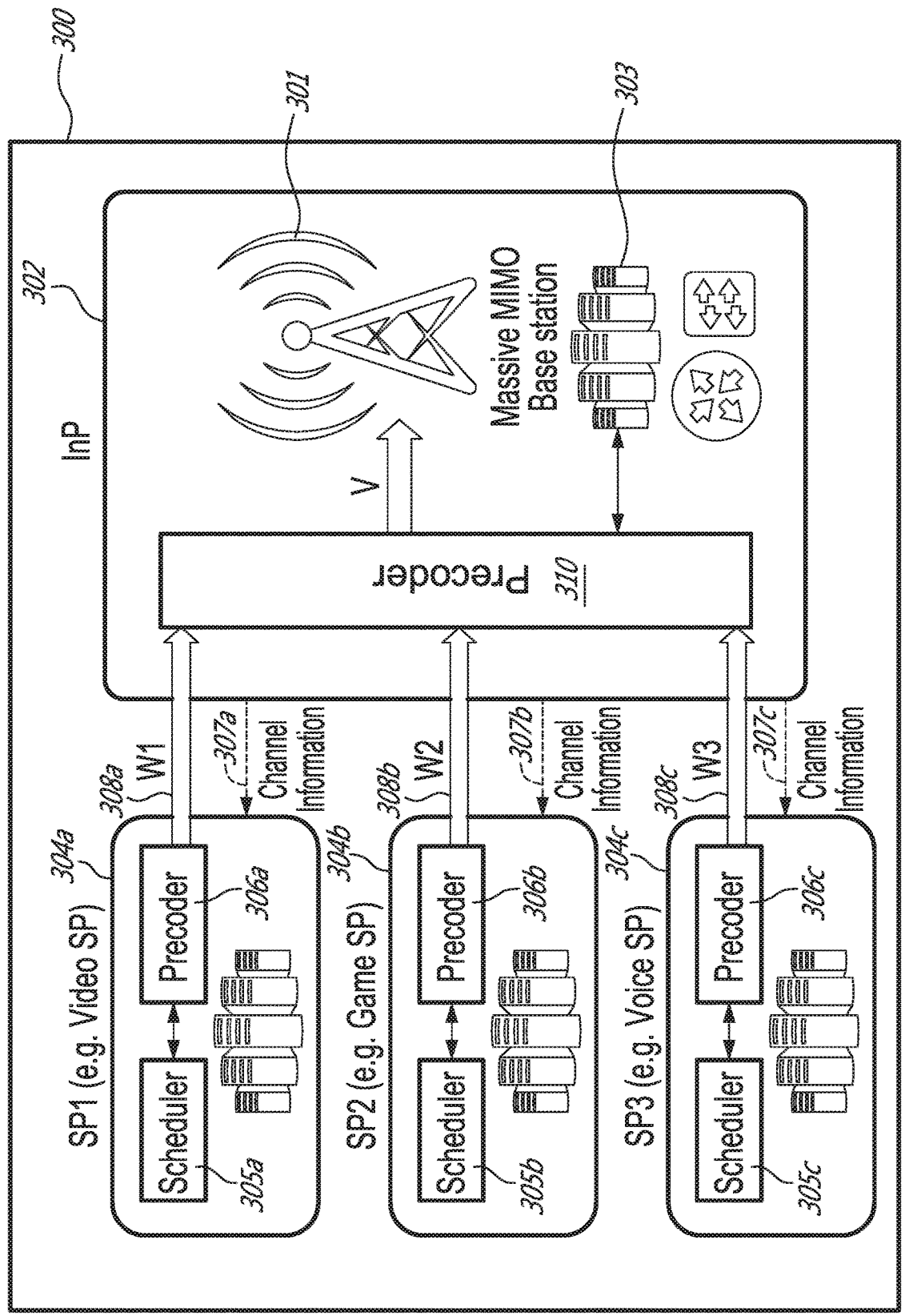
FIG. 3 illustrates a virtualized MU-MIMO network in which embodiments of the present disclosure may be implemented.

Referring now to FIG. 3, we have shown a virtualized wireless network architecture 300 according to an embodiment of the present disclosure.

In this example, a one-cell cellular network 301 has an InP 302 that owns a base station (BS) with multiple antennas. In FIG. 3, 3 Service Providers (304a-c) are illustrated that provide various services, such as video (304a), gaming (304b) and voice services (304c). As used herein, Service Providers 304 refers to one or more of Service Providers 304a-c.

The SPs 304 are each provided with their own virtual scheduler 305a-c and precoders 306a-c. It should be noted that although in FIG. 3 the computation resources of the schedulers 305 and precoders 306 are owned and provided by the InP, it is also envisaged that each SP could own some of their computational resources separate from the common equipment of the InP. In FIG. 3, each SP 304 receives via the InP infrastructure 302 Channel State Information (CSI) 307a-c of their respective users. With CSI 307, the SPs 304 make use of their assigned schedulers 305 and precoders 306 to derive their respective precoding matrices 308a-c. However, as explained earlier, if the InP simply made use of the precoding matrices designed by the SPs, then the SPs would cause interference to each other. Accordingly, in the present disclosure, the InP 302 makes use of the precoding matrices 308 designed by the SPs 304 and calculates and selects at InP precoder 310 a preferred precoding matrix such that the users of SPs receive the signals designed for them by the SPs 304 via their precoding matrices 308.

As will be described in detail further below, it is shown that an implementation with multiple base stations can be also addressed with this model, that is, a base station with N antennas and M SPs that have their schedulers and precoders. We denote $K_m$ as the number of users of SP m and $H_m \in C^{K_m \times N}$ as the flat fading channel between the BS and the users of SP m. Assume that SPs have access to a computational resource to perform scheduling and design the precoding matrices. Let $W_m$ denote the precoding matrix of SP m.

Virtualization is assumed to be implemented in a manner transparent to the users. In other words, the users of a SP should receive signals with a defined throughput and quality of service (QoS) by the SP through the precoding matrix. As indicated above, the InP calculates and selects a precoding matrix V such that the users of SPs receive the signals designed for them (by the SPs through $W_m$).

In addition to the constraints derived from the requirement of wireless network virtualization, there may be additional constraints such as a limit on the total transmit power. In one embodiment, minimizing the transmission power is the objective of the InP, while satisfying the SPs expectation for QoS and throughput.

The service that the InP provides for the SP is based on a contract or long-term agreement between the parties, which specifies physical parameters such as the number of antennas that the InP should provide for the SP, the maximum transmission power and the performance expectations of the SPs (i.e. the QoS). Regarding the number of antennas in this agreement, note that a SP may not employ all the antennas of the InP. Alternately, the InP may not be willing to provide access to the entire set of antennas to a specific SP due to considerations such as fault tolerance.

According to the contract and the requirements of wireless network virtualization, a number of steps are to be performed by network nodes at the InP and the SPs as follows:

1. For each SP m 304, a InP network node 301 selects $N_m$ antennas from all the available antennas and obtains the corresponding channel information $G_m$ 307.
2. Each SP 304 designs the precoding matrix $W_m$ 308 for its users and communicates them to the InP 302.
3. The InP network node collects all $W_m$ and chooses which antenna to employ and accordingly calculates and selects a precoding matrix V 310.

The steps of the method are summarized in Table 1 below.

| Step | InP | SPs |
|------|-----|-----|
| 1 | Choose subsets of antenna ($N_m$ antennas) for the SPs from the available set of antennas and provide the SPs with the corresponding channel information. | |
| 2 | Receives the precoding matrix from the SPs. | Design the precoding matrix by using the channel information and the current state of the system. |
| 3 | Calculates and selects the final precoding matrix using the indicated algorithms below:<br>a. If the CSI is perfectly known<br>b. if the CSI is not perfectly known | |

It should be noted that it is assumed that synchronization and channel estimations are done by the InP 302 such that the InP knows the channel information 307 of all users. However, due to considerations such as users' privacy, the InP provides an SP with only the channel information 307 of the users that belong to that SP. The SPs then schedule users and design the precoding with the channel information of their respective users 307a-c.

It could also be assumed that the 'SPs' estimate the CSI of their users 311 and provide that information to the InP such that the InP can design the final precoding matrix. Thus, the channel information can also be obtained by each SP and forwarded to the InP.

The term "perfect" CSI as used in this disclosure means that each of the CSI channel parameters are known. The term "imperfect" CSI as used in this disclosure means that only a subset of the CSI channel parameters are known, where a "subset" of CSI channel parameters means that less than all CSI channel parameters are known (or known only within a defined margin of error) and/or noisy estimated values of the CSI channel parameters, rather than exact values, are known. In one embodiment, it is assumed that the InP has an algorithm to choose a subset of antennas for each SP, and the SPs have their own precoding algorithm to design their preferred precoding matrix. These algorithms can be viewed as software running at a network node or the base station. In Step 3, the InP obtains the precoding matrices of the various SPs and finds a subset of antennas for transmission and accordingly calculates and selects the final precoding matrix. According to a disclosed embodiment, the method employs an algorithm as further defined below to solve this problem.

The disclosed embodiments comprise the steps summarized in Table 1. These embodiments are associated with Steps 3a and 3b and the selection of the transmission antennas.

Embodiment 1

Minimizing transmission power subject to Inter-SP interference

The first embodiment disclosed herein comprises a method to calculate and select the weights for a virtualized M-MIMO implementation to minimize the transmission power, subject to a set of constraints on the inter-SP interference such that the degradation in signal quality of a given SP is less than a defined threshold. The following mathematical details provide the basis and context for the description of the system under consideration as well as the implementation of the proposed method.

The user channel information $H_m$ can be obtained by employing one or more of a number of measurement parameters, such as CQI feedback based on CSI-RS, RSRQ, and RS-SINR for example on DL transmissions, and SRS on UL transmissions, for networks employing LTE functionality. The InP can either obtain this directly or via the SP as indicated below.

Step 1: The InP obtains from each SP m, for m=1, ..., M, the channel information, $G_m$, of the users of SP m.

Step 2: The InP chooses a set of antennas for the transmission period under consideration. The transmission period can be permanent, semi-permanent, or dynamic on a frame or subframe basis. Let $x_m \in C^{K_m}$ represent the symbols (messages) for the users of SP, m and define x as $$x=[x_1; \ldots ;x_m]. \qquad \#(1)$$

Without loss of generality, assume that the messages of the SPs are zero-mean and uncorrelated and normalized to 1, i.e., $$\mathbb{E}\,x_m = 0 \qquad \#(2)$$

$$\mathbb{E}\,x_m^H x_n = \begin{cases} 0 & \text{if } m \neq n; \\ 1 & \text{if } m = n. \end{cases}$$

Let $V=[V_1, \ldots, V_M]$ be the precoding vector that the InP is to design. Then the users of SP m have a received signal $y_m$ $$y_m = H_m V_m x_m + \Sigma_{i \neq m} H_m V_i x_i. \qquad \#(3)$$

The precoding matrix V should be calculated and selected in a way that the received signal in (3) does not deviate significantly from the signal that SP m expects that its users will receive, i.e.

$$y'_m = G_m W_m x_m. \qquad \#(4)$$

Mathematically, for each SP m, the InP should satisfy the following inequality $$\mathbb{E}_x \|y_m - y'_m\|^2 \leq \mathcal{J}_m^2 \qquad \#(5)$$

where $\mathcal{J}_m$ is a predefined threshold. This can be re-written as $$\mathbb{E}_x \|H_m V x - G_m W_m x_m\|^2 \leq \mathcal{J}_m^2. \qquad \#(6)$$

Furthermore, the left-hand side of equation (6) is given by $$\mathbb{E}_x \|H_m V x - G_m W_m x_m\|^2 = \|H_m V_m - G_m W_m\|_F^2 + \sum_{i \neq m} \|H_m V_i\|_F^2, \qquad \#(7)$$

in which $\|\cdot\|_F$ denotes the Frobenius norm, i.e.

$$\|X\|_F^2 = \text{Trace}(XX^H) \#.\#\#\#\#\#\# \qquad \#(8)$$

This embodiment employs power minimization as the objective of the InP subject to the SP's performance expectations. In this embodiment, the InP solves the optimization problem given by $$\min_V \quad \|V\|^2 \qquad \#(9)$$

$$\text{subject to:} \quad \|H_m V_m - G_m W_m\|_F^2 + \sum_{i \neq m} \|H_m V_i\|_F^2 \leq \mathcal{J}_m^2 \ \forall m.$$

This problem is a convex program. One can use commercial solvers to find the optimal solution to this problem, or follow the iterative algorithm proposed below. This algorithm is based on the sub-gradient method. The steps of the method are summarised below:

The following parameters are employed in the method.

$H_m$: channel of users of SP m.

$G_m$: channel advertised by InP to SP m.

$W_m$: precoding matrix designed by SP m.

$\mathcal{J}_m$: threshold for the maximum deviation from SP m precoding.

α: step-size in sub-gradient method.

δ: algorithm precision.

V: the final precoding matrix designed by the InP

---

Algorithm 1 Minimising transmission power subject to constraints on the SPs

Input: $H_m$, $G_m$, $W_m$, $\mathcal{J}_m^2$, α, δ
Output: An optimum beamforming matrix V Initialization: $\gamma_0 = 0$ 1 While $(|V^*_j - 0\ V^*_{j-1}| + 21 > \delta)$
2  $V^*_m = (I + \sum \lambda_j^i H_i^H H_i)^{-1} H_m^H G_m W_m$
  $V^*(\lambda_j) = [V_1^*, \ldots, V_M^*]$ -continued

| Algorithm 1 Minimising transmission power subject to contraints on the SPs |
| --- |
| Input: $H_m$, $G_m$, $W_m$, $\mathcal{J}_m^2$, $\alpha$, $\delta$ <br> Output: An optimum beamforming matrix V |
| Initialization: $\gamma_0 = 0$ |

3  $\quad d = (d_1, \ldots, d_M)^T$ $$d_i = \left( \|H_m V_m^* - G_m W_m\|_F^2 \sum_{i \neq m} \|H_m\|_F^2 \right) - \mathcal{J}_m^2$$

4  $\quad \gamma_j = \gamma_i + ad$
5  $\quad$ endwhile

Embodiment 2

Solution Under Non-Perfect Channel Information

In this embodiment the unknown true channel of the users of SP m, defined as $H_m$ $$H_m = \hat{H}_m + E_m \qquad \#(10)$$

is adopted for the channel where, $\hat{H}_m$ is the estimated channel, and $E_m$ is the channel estimation error. Given that the true channel is unknown, the problem is formulated with probabilistic constraints.
In this embodiment, the formulation yields the following problem:

$$\min_V \|V\|^2 \qquad \#(11)$$

$$\text{subject to:} \quad \mathbb{P}\left\{ \|H_m V_m - G_m W_m\|_F^2 + \sum_{i \neq m} \|H_m V_i\|_F^2 \leq \mathcal{J}_m^2 \right\} \geq 1 - \epsilon$$

In the following sections, we refer to the probability in (11) as "reliability".

This is an optimization problem with probabilistic constraints, and in general, these problems are difficult to solve with a closed form optimal solution. In this embodiment, an algorithm is proposed that provides a nearly optimal solution.

Note that the CSI information for channel $H_m$ can be obtained by employing one or more of a number of measurement parameters, such as CQI feedback based on CSI-RS, RSRQ, and RS-SINR for example on DL transmissions, and SRS on UL transmissions, for networks employing LTE functionality. For networks implemented with Radio Access Technologies other than LTE, without loss of generality, similar or equivalent channel measurements may be employed.

Probabilistic Analysis of Deviation for Non-Perfect CSI

For reference, a closed-form expression for the cumulative distribution function of a quadratic function of a standard circular complex Gaussian random vector, which will be used in the algorithm, is provided in equations (12) and (13).
Given $$P(\|Ae + b\|^2 \leq \tau) = \int_{-\infty}^{\infty} \frac{e^{\tau(\beta + j\omega)}}{(\beta + j\omega)} \frac{e^{-c_0(\omega) + c(\omega)}}{\prod_i (1 + (\beta + j\omega)D_i^2)} d\omega \text{ where} \qquad \#(12)$$

-continued $$c_0(\omega) = (\beta + j\omega) b^H b \qquad \#(13)$$

$$c(\omega) = (\beta + j\omega)^2 \sum_i \frac{|\alpha_i|^2 D_i^2}{1 + (\beta + j\omega) D_i^2}$$

$$a = U^H b$$

$$UDQ = svd(A)$$

For some $\beta > 0$.
To invoke this expression in the method of embodiment 2, we transform the derivation to the vector form as follows:

$$\|H_m V_m - G_m W_m\|_F^2 + \sum_{i \neq m} \|H_m V_i\|_F^2 = \qquad \#(14)$$

$$\|H_m V - G_m [0, \ldots, W_m, \ldots, 0]\|^2 = \|Ae + b\|^2 \text{ where}$$

$$A = (V^T \otimes I_{K_m}) C_e^{\{\frac{1}{2}\}} \qquad \#(15)$$

$$e_m = vec(E_m)$$

$$b_m = vec(\hat{H}_m V - G_m [0, \ldots, W_m, \ldots, 0])$$

Lower Bound for the Problem Given in (11)

The derivation in (7) can be re-written as the sum of KN independent random variables. Assuming this sum converges to a normally distributed random variable (re FIG. 4), it follows that for this normally distributed random variable the following property holds:
for $\epsilon \leq 0.5$, $$\mathbb{P}\{\|H_m V - G_m [0, \ldots, W_m, \ldots, 0]\| \leq \mathcal{J}_m\} \geq 1 - \epsilon \qquad \#(16)$$

implies $$\mathbb{E}\|H_m V - G_m [0, \ldots, W_m, \ldots, 0]\|^2 \leq \mathcal{J}_m^2. \qquad \#(17)$$

The expected value in (17) is given by $$\mathbb{E} \|H_m V - G_m [0, \ldots, W_m, \ldots, 0]\|^2 = \|DV\|^2 + \|\hat{H}_m V - G_m [0, \ldots, W_m, \ldots, 0]\|^2 \qquad \#(18)$$

Where D is a diagonal matrix diag($D_1, \ldots, D_N$) with $$D_i = \sqrt{\sum_i \sigma_{i,j}^2}, \text{ where} \qquad \#(19)$$

$$\mathbb{E} E_{ij} E_{tp} = \sigma_{i,j}^2 \delta_{it} \delta_{jp} \qquad \#(20)$$

It follows that the convex optimization problem given by $$\min_V \|V\| \qquad \#(21)$$

$$\text{subject to:} \quad \mathbb{E}\|H_m V - G_m [0, \ldots, W_m, \ldots, 0]\|^2 \leq \mathcal{J}_m^2.$$

provides a lower bound to the optimization problem defined in (11). This lower bound will be used to design the proposed algorithm and to evaluate the performance of the algorithm.
Solution to Problem (11)
The proposed solution is based on the lower bound derived above. In each step the feasibility set of problem (21) is reduced by a factor $\theta$ and the solution is checked to determine if it is a feasible solution to the original problem by using the equation given in (12).

Defining the optimization problem $P_\theta$ as:

$$P_\theta: \min_V \quad \|V\| \quad \#(22)$$

$$\text{subject to: } \mathbb{E}\|H_m V - G_m[0, \ldots, W_m, \ldots, 0]\|_F^2 \leq (\theta \mathcal{J}_m)^2.$$

Note that $P_\theta$ is a convex programming problem and hence can be solved efficiently. Let $V_\theta$ be its optimal solution. Then, the algorithm is summarised below.

Algorithm 2 Minimizing total transmission power
Input: $H_m$, $G_m$, $W_m$, $\mathcal{J}_m^2$, $\delta$ (algorithm precision)
Output: An optimum beamforming matrix V Initialization: $\theta = 1$
While 1
  Solve problem $P_\theta$
  Check the feasibility using equation (12) for all m
  If feasible, $V^* = V_\theta$, break
  Else, $\theta = \theta - \delta$
  If $\theta < 0$, $V^* = \inf$, break (The problem is infeasible)
Endwhile

Embodiment 3

Adding SINR Constraints

In addition to serving the SPs, the InP may have a set of users that are to be served by the InP. Thus, in addition to the constraints for the SPs, the InP should consider a set of QoS constraints for these users. Adding these QoS constraints to the optimization problem leads to a new optimization problem which can be potentially complicated. The proposed alternate approach is to count the InP itself as a new SP, denoted as SP0. In this embodiment, SP0 designs a precoding matrix for its users based on traditional precoding schemes to guarantee its users' QoS. The InP can then easily solve the optimization given in (9) or (11), but with one additional SP.

Mitigating Inter-Cell Interference

In this embodiment, comprising a multicell-network, the BS maintains the interference to neighbouring cells to be under a defined threshold. Let $H_0$ be the channel between the BS and the users of neighboring cells. The interference to these users is bounded to be below a threshold $J_0$, or mathematically, $$\|H_0 V\| \leq \mathcal{J}_0 \quad \#(23)$$

This constraint has the same form as the constraints for the SP but with $W_m = 0$. Therefore, adding constraints to suppress the interference in the neighboring cells leads to an optimization problem with the same form as (9) or (11) but with additional constraints.

Adding Per User Constraints

From the constraints in (9) or (11), it can be noted that the constraints ensure that the total sum of the deviations of all users of each SP is guaranteed to be below a given value. However, it does not necessarily impose a limit on the deviation for each of the users. The InP can customize its service to the SPs by allowing them to set also the deviation limit per user, which means the InP can satisfy the following constraints $$\mathbb{E}_x[\|h_m^k V x - g_m^k W_m x_m\|^2] \leq \mathcal{J}_m \quad \forall k \in \hat{K}_m \quad \#(24)$$

where $h_m^k$, is the channel of kth users of SP m. These constraints have the same form as the constraints in problem (9) or (11). Thus, the same approach can be applied to solve this optimization problem.

Relaxed Antenna Selection Algorithm

The previous algorithms assume that the BS employs all the antennas for transmission. This assumption can be relaxed by the algorithm proposed in this embodiment. Switching off several antennas can potentially reduce the total power by turning off the RF-chain circuit of those antennas.

Denote $P_{RF}$ as the power consumed per RF-chain. This following summarises this algorithm.

Figure 4:
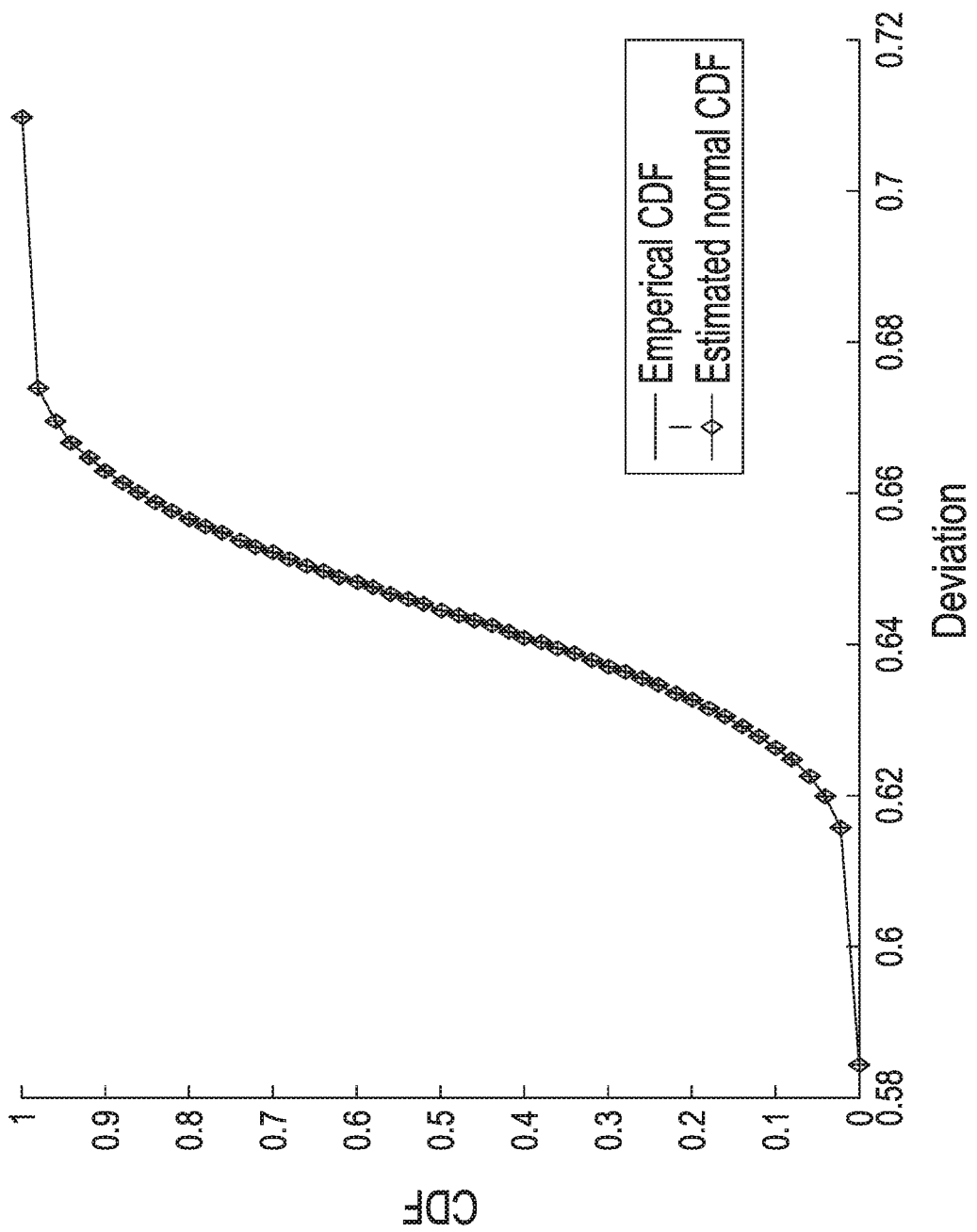
FIG. 4 is a diagram illustrating a curve of a small deviation from the Gaussian CDF according to another embodiment of the disclosed subject matter.

Algorithm 2 Minimizing the maximum per relay power
Input: $H_m$, $G_m$, $W_m$, $\mathcal{J}_m^2$
Output: $\mathcal{N}$ Initialization: $\mathcal{N} = \{1, \ldots, N\}$, $P_{\{old\}} = \inf$
While 1
  Solve optimization problem (9) or (11) for $\mathcal{N}$, depending on perfect or non-perfect channel information
  $P_{\{new\}} = \|V\|^2 + P_{RF} \text{ size}(\mathcal{N})$
  If $P_{\{new\}} > P_{\{old\}}$, break;
  Else, $P_{\{old\}} = P_{\{new\}}$
  Turn off the antenna that corresponds to the row of $V^*$ having the smallest norm and remove the corresponding antenna from $\mathcal{N}$
Endwhile FIG. 4 is a plot showing the small deviation from the Gaussian CDF.

Figure 5:
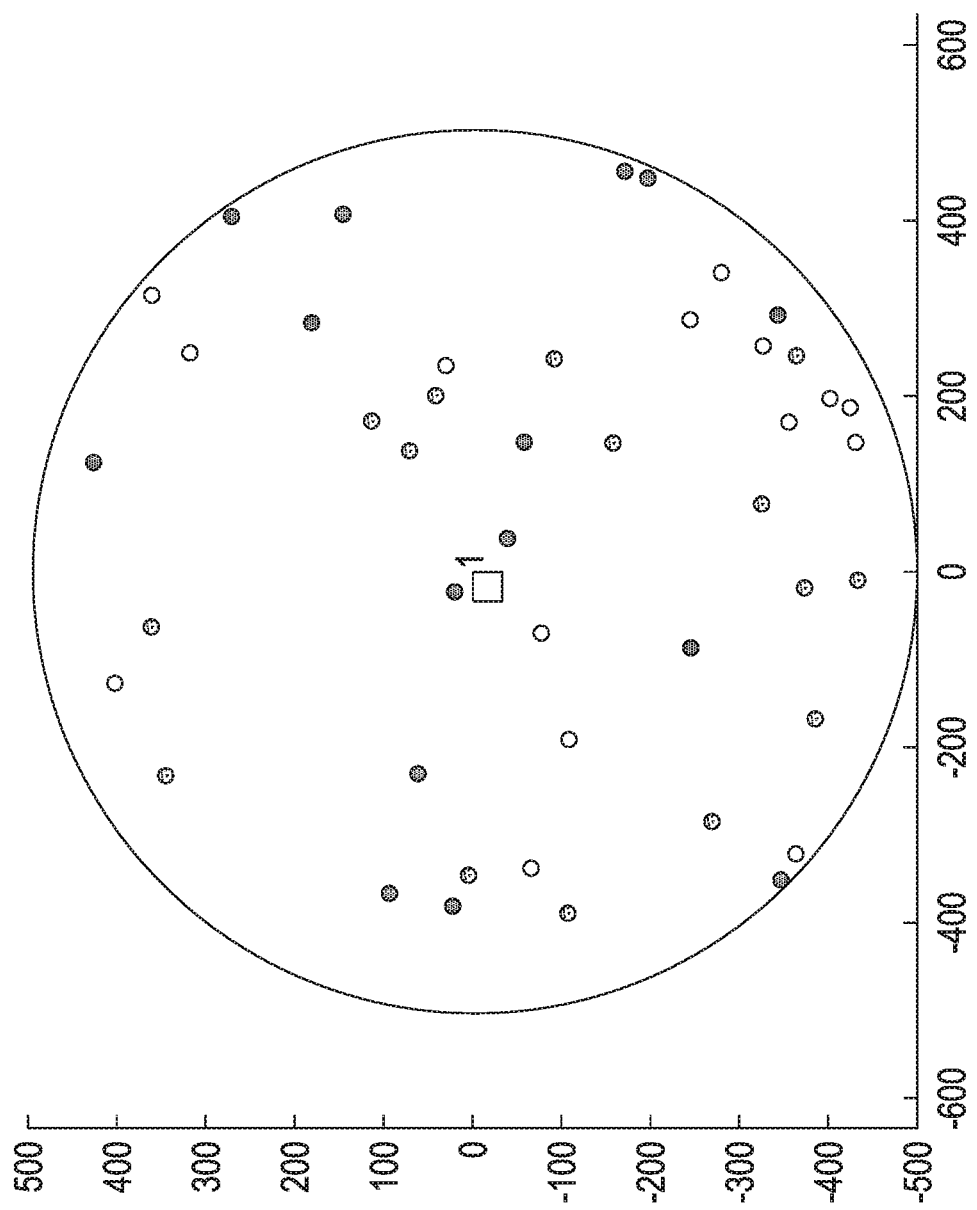
FIG. 5 is a diagram illustrating a plot of cell and users of different SPs according to another embodiment of the disclosed subject matter.
Figure 6:
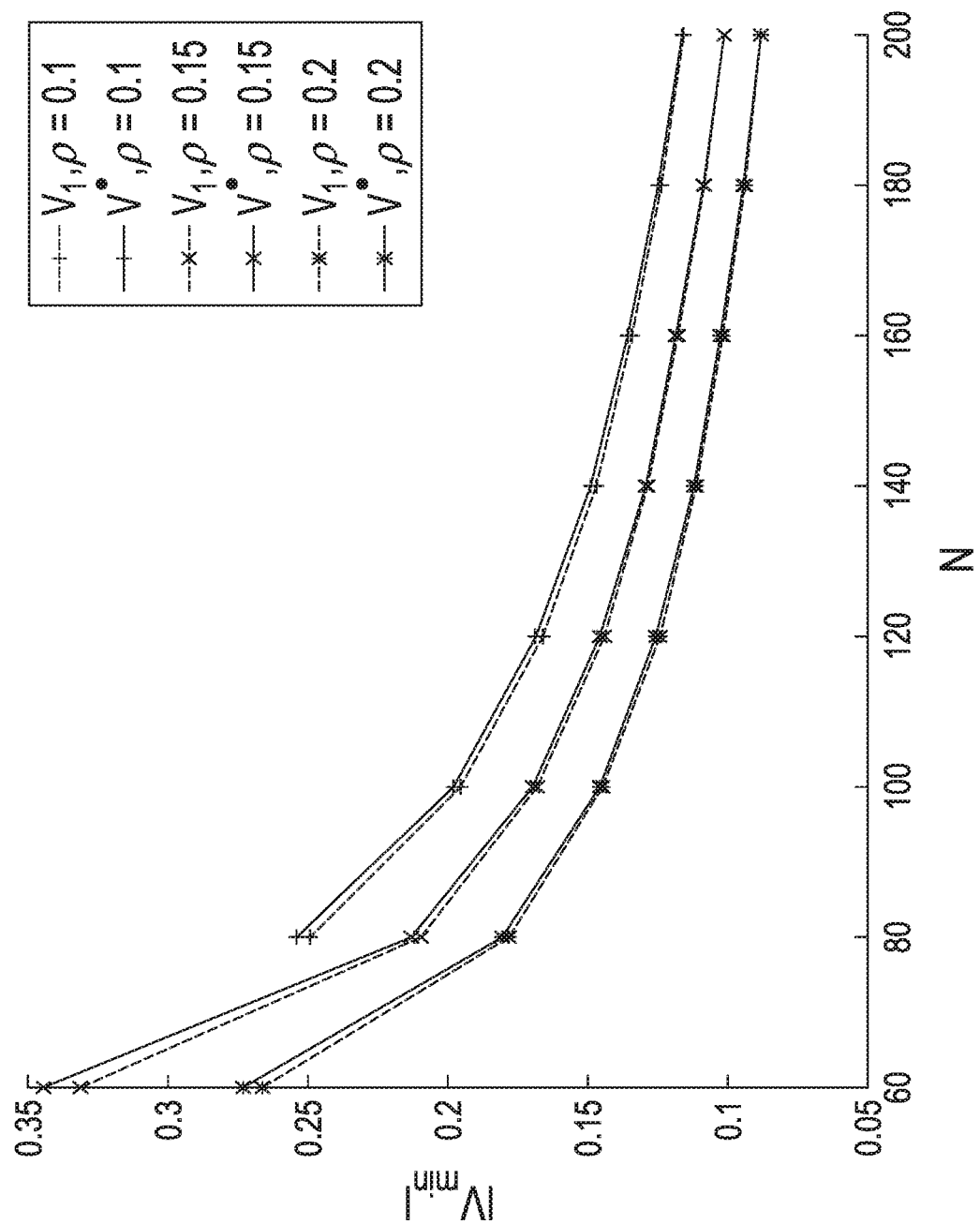
FIG. 6 is a diagram illustrating a curve of transmission power versus number of antennas according to another embodiment of the disclosed subject matter.
Figure 7:
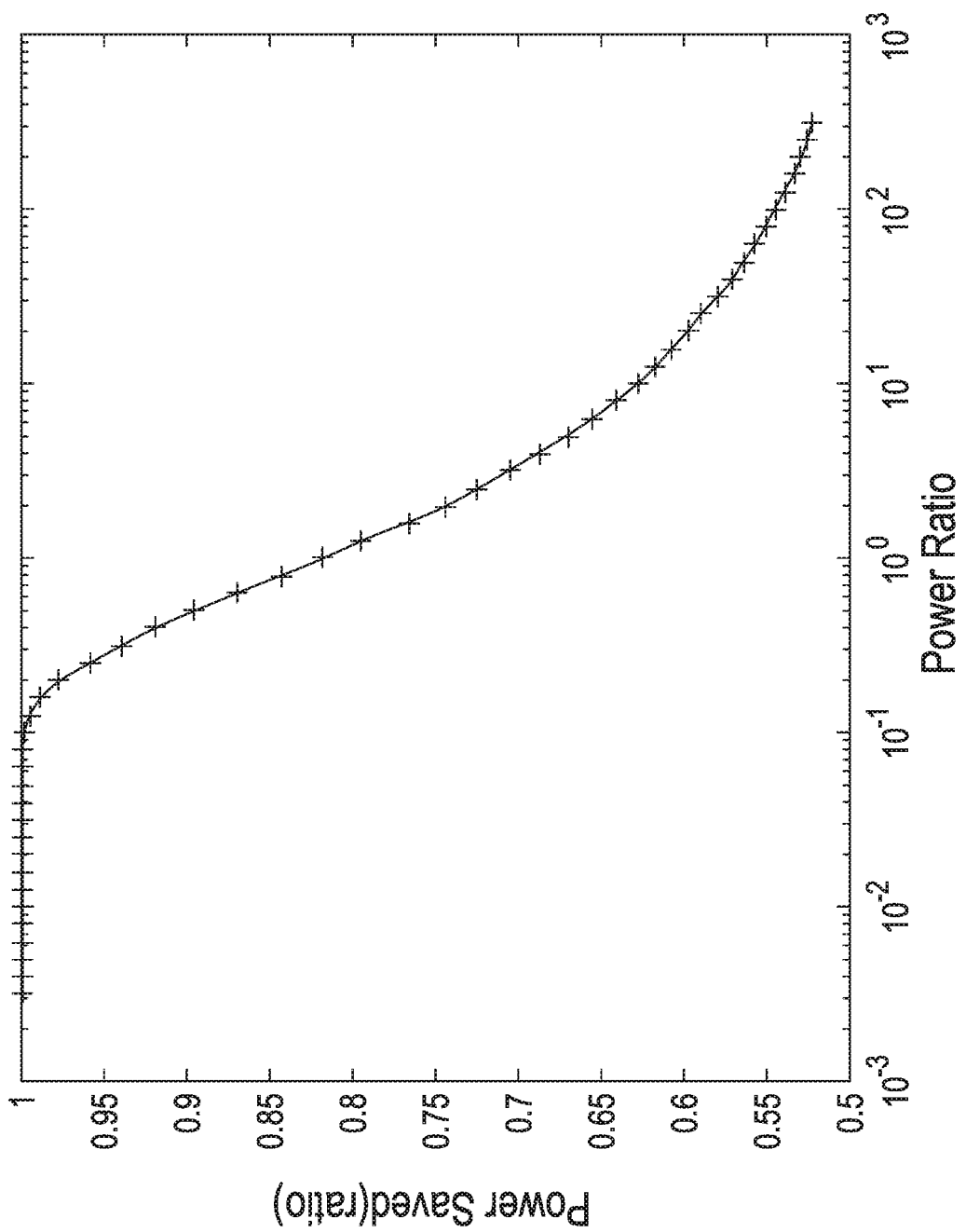
FIG. 7 is a diagram illustrating a curve of the power saved according to another embodiment of the disclosed subject matter.

FIGS. 5-7 provide numerically simulated evaluations of the algorithm described herein. The table below summarizes the default parameters of the simulation.

| Parameter | Value |
| --- | --- |
| M | 3 |
| $K_m$ | 15 |
| $N_m$ | 50 (chosen randomly) |
| N | 140 |
| ε | 0.1 |
| $\mathcal{J}_m$ | $\rho \|G_m W_m\|$ |
| ρ | 0.1 |
| $\|W_m\|$ | $\sqrt{P}/\sqrt{M}$ |
| P | 20 dBm |
| n | −174 dBm/Hz |
| Average Channel Error | 7% |

As illustrated in FIG. 5, users are assumed to be distributed uniformly across the cells and the following model has been adopted for the channel:

$$h_k = \beta_k^{1/2} g_k$$

$$\beta_k[\text{dB}] = -31.54 - 37.1 \log_{10}(d_k) - 8\psi_k,$$

where $g_k$ is distributed as $CN(0, I)$ and is used to model small scale fading, and β captures path loss and shadowing effects.

FIG. 6 displays the transmission power of the precoding algorithm proposed in above for embodiment 2 with respect to the number of antennas. The dashed lines represent the lower-bound proposed in embodiment 2 while the solid lines represent the proposed solution. The figure shows that the gap between the lower bound and the proposed solution is small, so that the proposed solution is very close to optimal.

FIG. 7 is a numerical demonstration of the outcome of the algorithm of the proposed embodiment. As this figure shows, the disclosed method can save a significant amount of the power when the power ratio (transmission power over RF-chain power) is large. That is, the power saved is the ratio of saved power by switching off the antennas over using all the antennas.

Referring to FIG. 8A, a wireless communication device 800A comprises a processor 805 (e.g., Central Processing Units [CPUs], Application Specific Integrated Circuits [ASICs], Field Programmable Gate Arrays [FPGAs], and/or the like), a memory 810, a transceiver 815, and an antenna 820. In certain embodiments, some or all of the functionality described as being provided by UEs, MTC or M2M devices, and/or any other types of wireless communication devices may be provided by the device processor executing instructions stored on a computer-readable medium, such as memory 810. Alternative embodiments may include additional components beyond those shown in FIG. 8A that may be responsible for providing certain aspects of the device's functionality, including any of the functionality described herein.

Referring to FIG. 8B, a wireless communication device 800B comprises at least one module 825 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 8A.

In some embodiments, a computer program including instructions which, when executed by the at least one processor 805, causes the at least one processor 805 to carry out at least some of the functionality of the wireless device 800 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Referring to FIG. 9A, a radio access node 900A comprises a control system 920 that comprises a node processor 905 (e.g., Central Processing Units (CPUs), Application Specific Integrated Circuits (ASICs), Field Programmable Gate Arrays (FPGAs), and/or the like), memory 910, and a network interface 915. In addition, radio access node 900A comprises at least one radio unit 925 comprising at least one transmitter 935 and at least one receiver coupled to at least one antenna 930. In some embodiments, radio unit 925 is external to control system 920 and connected to control system 920 via, e.g., a wired connection (e.g., an optical cable). However, in some other embodiments, radio unit 925 and potentially the antenna 930 are integrated together with control system 920. Node processor 905 operates to provide at least one function 945 of radio access node 900A as described herein. In some embodiments, the function(s) are implemented in software that is stored, e.g., in the memory 910 and executed by node processor 905.

In certain embodiments, some or all of the functionality described as being provided by a base station, a node B, an enodeB, and/or any other type of network node may be provided by node processor 905 executing instructions stored on a computer-readable medium, such as memory 910 shown in FIG. 9A. Alternative embodiments of radio access node 900 may comprise additional components to provide additional functionality, such as the functionality described herein and/or related supporting functionality.

Referring to FIG. 9B, a radio access node 900B comprises at least one module 950 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 9A.

Figure 10:
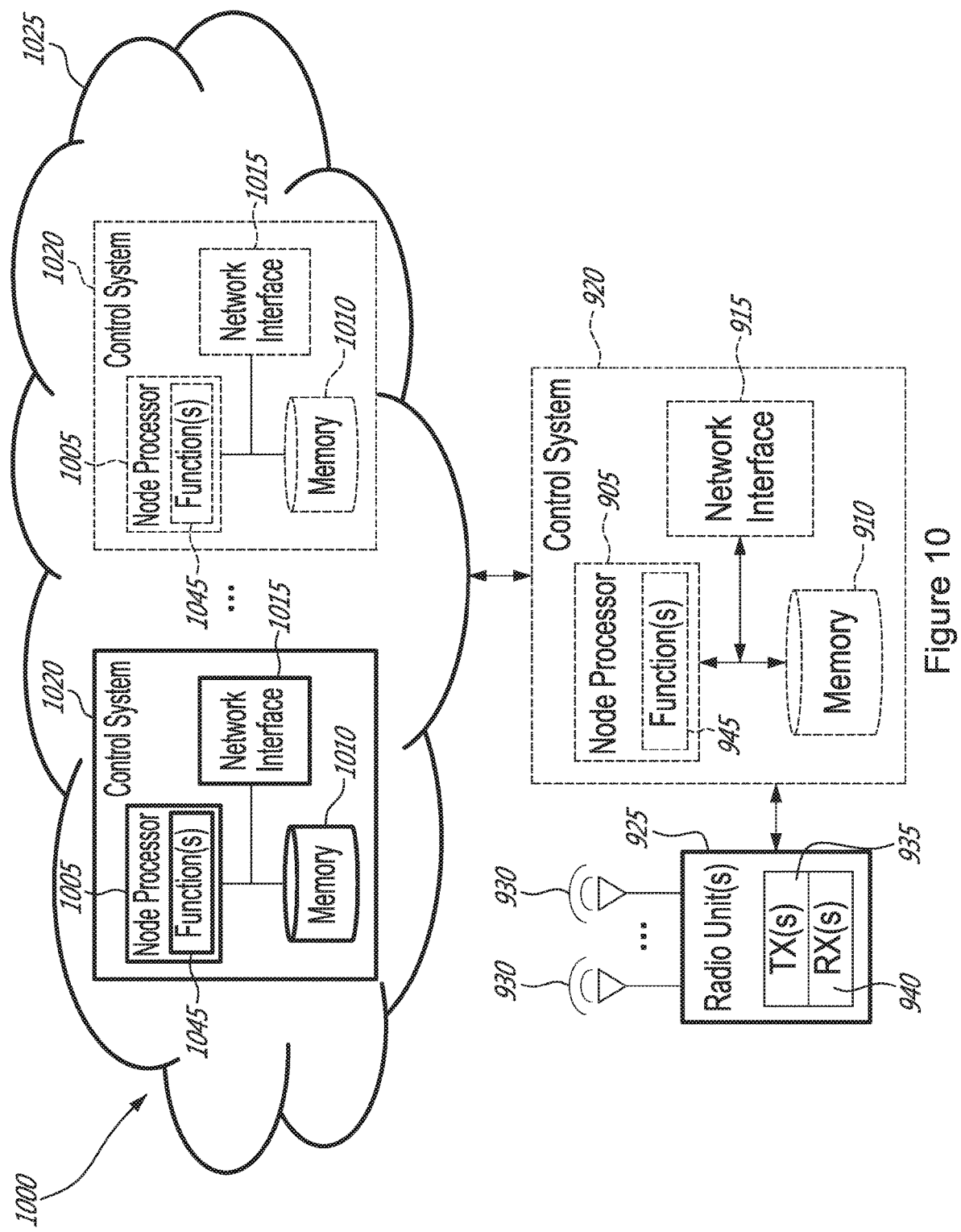
FIG. 10 illustrates a radio access node according to yet another embodiment of the disclosed subject matter.

FIG. 10 is a block diagram that illustrates a virtualized radio access node 1000 according to an embodiment of the disclosed subject matter. The concepts described in relation to FIG. 10 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 10, radio access node 1000 comprises control system 920 as described in relation to FIG. 9A.

Control system 920 is connected to one or more processing nodes 1020 coupled to or included as part of a network(s) 1025 via network interface 915. Each processing node 1020 comprises one or more processors 1005 (e.g., CPUs, ASICs, FPGAs, and/or the like), memory 1010, and a network interface 1015.

In this example, functions 945 of radio access node 900A described herein are implemented at the one or more processing nodes 1020 or distributed across control system 920 and the one or more processing nodes 1020 in any desired manner. In some embodiments, some or all of the functions 945 of radio access node 900A described herein are implemented as virtual components executed by one or more virtual machines implemented in a virtual environment(s) hosted by processing node(s) 1020. As will be appreciated by one of ordinary skill in the art, additional signaling or communication between processing node(s) 1020 and control system 920 is used in order to carry out at least some of the desired functions 945. As indicated by dotted lines, in some embodiments control system 920 may be omitted, in which case the radio unit(s) 925 communicate directly with the processing node(s) 1020 via an appropriate network interface(s).

In some embodiments, a computer program comprises instructions which, when executed by at least one processor, causes at least one processor to carry out the functionality of a radio access node (e.g., radio access node 210 or 900A) or another node (e.g., processing node 1020) implementing one or more of the functions of the radio access node in a virtual environment according to any of the embodiments described herein.

As used herein, radio access node 1000 is a "virtualized" network node in which at least a portion of the functionality of the network node is implemented as a virtual component (e.g., via a virtual machine(s) executing on a physical processing node(s) in a network(s)).

Figure 11:
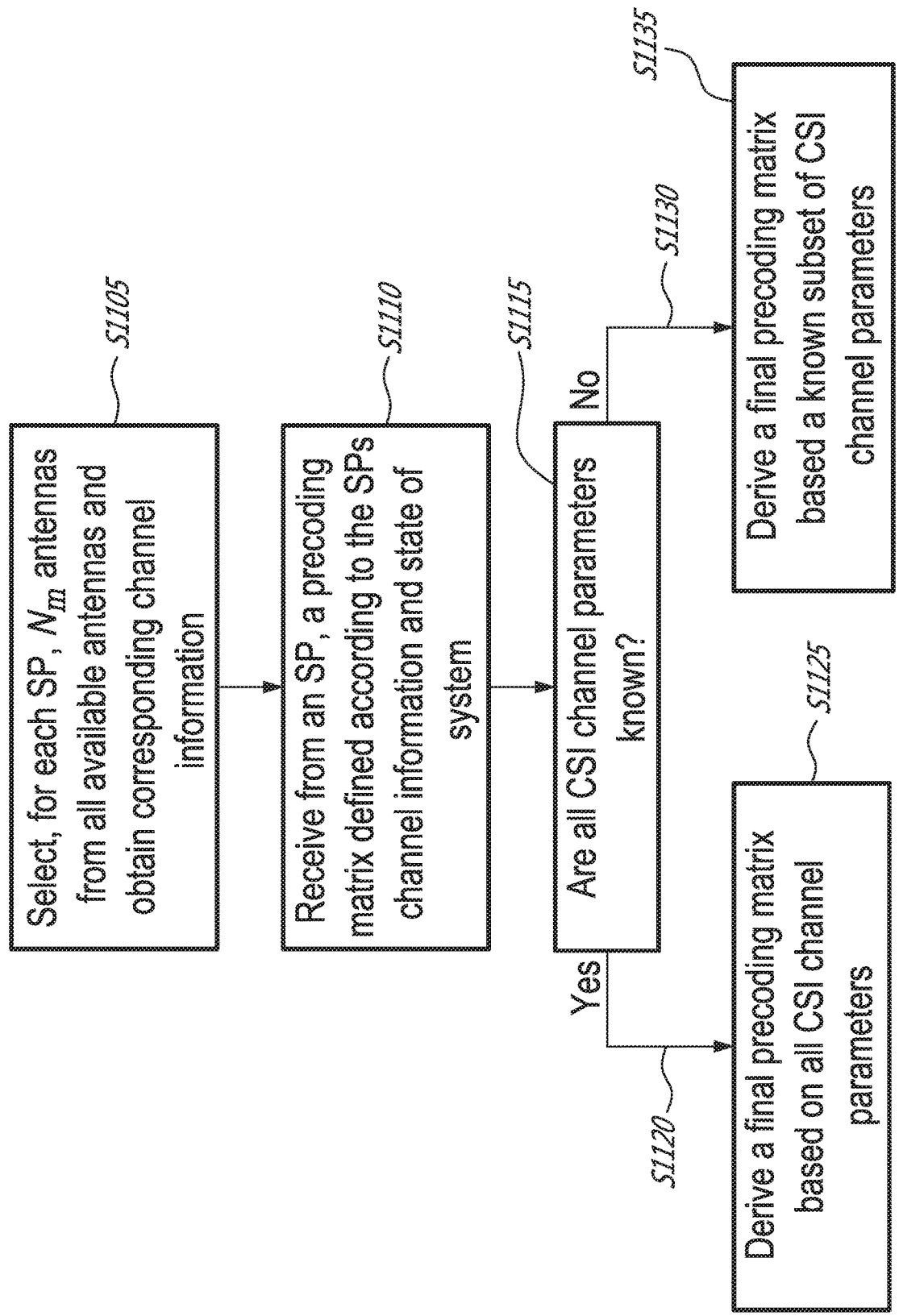
FIG. 11 illustrates a method of operating a network node according to embodiments of the disclosed subject matter.

FIG. 11 illustrate methods of operating a network node according to embodiments of the disclosed subject matter. The methods could be performed by an apparatus such as that illustrated in any of FIGS. 7-10, for instance. Additionally, the methods may be performed in conjunction with any of various alternative features as described above.

Referring to FIG. 11, the method comprises selecting at step (S1105), for each Service Provider (SP), N antennas from all available antennas and obtaining corresponding channel information. Receiving at step (S1110) from an SP, a precoding matrix defined according to the SPs channel information and state of system. Determining at step (S1115) if the Channel State Information (CSI) is completely known. If yes (S1120), then a final precoding matrix based on perfectly known CSI is derived at step (S1125). If the CSI is not completely known, step (S1130), then at step (S1135), a final precoding matrix is derived based on imperfect CSI.

Figure 12:
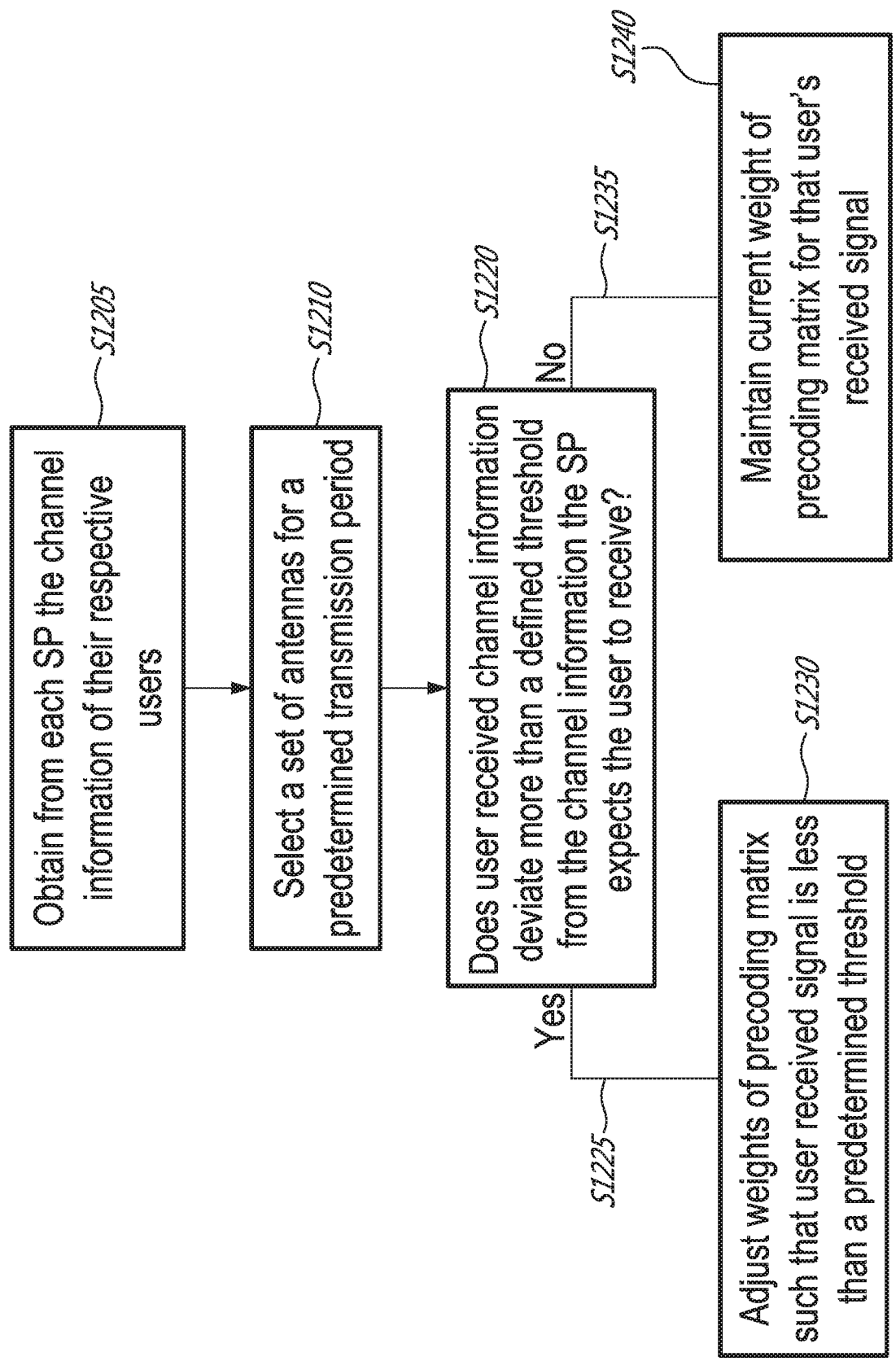
FIG. 12 illustrates a method of operating a network node according to another embodiment of the disclosed subject matter.

Referring to FIG. 12, the method comprises obtaining from each SP the channel information from each of their respective users at step (S1205). At step (S1010), a set of antennas is selected for a predetermined transmission period. This is done by the InP or NH who has control of the infrastructure. At step (S1220), a determination is made of whether the user received signal deviates more than what the SP expects to receive from the user.

If yes (S1225), the weights of the precoding matrix are adjusted such that the user received signal is less than a predetermined threshold (S1230). If not (S1235), the current weights of the precoding matrix for that user's received signal are maintained (S1240).

The following acronyms are used throughout this disclosure.

| | |
|---|---|
| 3GPP | Third Generation Partnership Project |
| 5G | Fifth Generation |
| ACK | Acknowledgement |
| ASIC | Application Specific Integrated Circuits |
| BS | Base Station |
| CB | Code Block |
| CBG | Code Block Group |
| CC | Component Carrier |
| CE | Control Element |
| CFI | Control Format Indicator |
| CMTC | Critical Machine Type Communication |
| CPU | Central Processing Units |
| CQI | Channel Quality Information |
| CRC | Cyclic Redundancy Check |
| CSI | Channel State Information |
| DAS | Distributed Antenna System |
| DCI | Downlink Control Information |
| DL | Downlink |
| DMRS | Demodulation Reference Signal |
| DSP | Digital Signal Processors |
| eNB | evolved NodeB, base station |
| eMBB | Enhanced Mobile Broadband |
| gNB | New Radio Base Station |
| EPDCCH | Enhanced Physical Downlink Control Channel |
| FPGA | Field Programmable Gate Arrays |
| HARQ | Hybrid Automatic Repeat Request |
| ID | Identifier |
| InP | Infrastructure Provider |
| LTE | Long Term Evolution |
| M2M | Machine-to-Machine |
| MAC | Medium Access Control |
| MCS | Modulation and Coding Scheme |
| M-MIMO | Massive MIMO |
| MU-MIMO | Multi-user MIMO |
| MIMO | Multi-input Multi-output |
| MTC | Machine Type Communication |
| NDI | Next Data Indicator |
| NH | Neutral Host |
| NR | New Radio |
| OFDM | Orthogonal Frequency Division Multiplexing |
| PDCCH | Physical Downlink Control Channel |
| PLMN | Public Land Mobile Network |
| PRB | Physical Resource Block |
| QAM | Quadrature Amplitude Modulation |
| QoS | Quality of Service |
| QPSK | Quadrature Phase Shift Keying |
| RAT | Radio Access Technology |
| Rel | Release |
| RB | Resource Block |
| RNTI | Radio Network Temporary Identifier |
| RRC | Radio Resource Control |
| RRH | Remote Radio Head |
| SCEF | Service Capability Exposure Function |
| SP | Service Provider |
| SPS | Semi-Persistent Scheduling |
| SR | Scheduling Request |
| TB | Transport Block |
| TBS | Transport Block Size |
| UE | User Equipment |
| UE-ID | User Equipment Identifier |
| UL | Uplink |
| URLLC | Ultra Reliable Low Latency Communication |
| UT | User Terminal |
| VRB | Virtual Resource Block |
| WAN | Wireless Access Network |

Those skilled in the art will recognize improvements and modifications to the embodiments of the present disclosure. All such improvements and modifications are considered within the scope of the concepts disclosed herein.

The invention claimed is:

1. A method in a network device of adjusting a channel precoding matrix for one or more users operating in a virtualized Massive Multi-Input Multi-Output (M-MIMO) wireless network managed by a neutral host, each of the users receiving wireless services from one or more service providers (SP) operating on the virtualized M-MIMO wireless network, comprising:
    selecting for each service provider, N antennas from all available antennas managed by the neutral host;
    obtaining from each service provider corresponding channel state information (CSI) parameters for each of their respective user;
    receiving from each service provider a precoding matrix calculated according to the obtained CSI parameters;
    determining if all CSI parameters are known; and
    if the CSI parameters are all known, a final precoding matrix based on the known CSI parameters is derived, whereas if only a subset of CSI parameters are known, a final precoding matrix based on the known subset of CSI parameters is derived.

2. A method as defined in claim 1, wherein the final precoding matrix is adjusted to reduce transmission power to minimize inter-SP interference under completely known CSI.

3. A method as defined in claim 2, wherein the final precoding matrix is adjusted by calculating and selecting weights for a virtualized M-MIMO implementation to minimize transmission power.

4. A method as defined in claim 3, wherein the transmission power is minimized subject to a set of constraints on inter-SP interference such that if degradation of signal quality of a given SP occurs, the transmission power is adjusted such that the degradation in signal quality of a given SP is less than a given threshold.

5. A method as defined in claim 1, wherein the final precoding matrix is adjusted to minimize inter-SP interference under incompletely known CSI.

6. A network device for adjusting a channel precoding matrix for one or more users operating in a virtualized Massive Multi-Input Multi-Output (M-MIMO) wireless network managed by a neutral host, each of the users receiving wireless services from one or more service providers (SP) operating on the virtualized M-MIMO wireless network, comprising:

N antennas, one or more of the N antennas being selected for each service provider;
processing circuitry comprising:
a memory; and
a processor, the memory in communication with the processor, the memory having instructions that, when executed by the processor, configure the processor to:
obtain from each service provider, corresponding channel information (CSI) parameters for each of their respective user;
receive from each service provider a precoding matrix calculated according to the obtained CSI parameters;
determine if all CSI) parameters are known; and
if the CSI parameters are all known, a final precoding matrix based on the known CSI parameters is derived, whereas if only a subset of CSI parameters are known, a final precoding matrix based on the known subset CSI parameters is derived.

7. A network device as defined in claim 6, wherein the final precoding matrix is adjusted to reduce transmission power to minimize inter-SP interference under perfect CSI.

8. A network device as defined in claim 6, wherein the final precoding matrix is adjusted to reduce transmission power to minimize inter-SP interference under non-perfect CSI.

9. A network device as defined in claim 7, wherein the final precoding matrix is adjusted by calculating and selecting weights for a virtualized M-MIMO implementation to minimize transmission power.

10. A network device as defined in claim 9, wherein the transmission power is minimized subject to a set of constraints on inter-SP interference such that if degradation of signal quality of a given SP occurs, the transmission power is adjusted such that the degradation in signal quality of a given SP is less than a given threshold.

* * * * *